(12) United States Patent
Leslie et al.

(10) Patent No.: US 11,829,162 B2
(45) Date of Patent: Nov. 28, 2023

(54) UNMANNED AERIAL VEHICLE LOCKING LANDING PAD

(71) Applicant: Teledyne FLIR Detection, Inc., Stillwater, OK (US)

(72) Inventors: Elliott Forrest Leslie, Cambridge, MA (US); Annan Michael Mozeika, Groton, MA (US)

(73) Assignee: Teledyne FLIR Detection, Inc., Stillwater, OK (US)

(*) Notice: Subject to any disclaimer, the term of this patent is extended or adjusted under 35 U.S.C. 154(b) by 270 days.

(21) Appl. No.: 16/994,346

(22) Filed: Aug. 14, 2020

(65) Prior Publication Data

US 2021/0048832 A1 Feb. 18, 2021

Related U.S. Application Data

(60) Provisional application No. 62/887,294, filed on Aug. 15, 2019.

(51) Int. Cl.
*G05D 1/10* (2006.01)
*B64C 39/02* (2023.01)
(Continued)

(52) U.S. Cl.
CPC .............. *G05D 1/101* (2013.01); *B60P 3/11* (2013.01); *B60R 9/048* (2013.01); *B60R 9/0426* (2013.01);
(Continued)

(58) Field of Classification Search
CPC ......... G05D 1/101; G05D 1/0276; B60P 3/11; B60R 9/0426; B60R 9/048; B64C 39/024;
(Continued)

(56) References Cited

U.S. PATENT DOCUMENTS

| | | | |
|---|---|---|---|
| 5,039,034 A | * | 8/1991 | Burgess ................. B64F 1/125 114/261 |
| 8,418,959 B2 | | 4/2013 | Kang et al. |

(Continued)

FOREIGN PATENT DOCUMENTS

| | | |
|---|---|---|
| CN | 104215239 A | 12/2014 |
| CN | 104656669 B | 5/2015 |

(Continued)

OTHER PUBLICATIONS

AIRobotics, 2016 https://www.airoboticsdrones.com/solutions/ [Downloaded: https://www.youtube.com/watch?v=wwLWiTUqvWE].

(Continued)

*Primary Examiner* — Richard M Camby
(74) *Attorney, Agent, or Firm* — Haynes and Boone, LLP

(57) ABSTRACT

This specification describes systems for unmanned aerial vehicle carrying and deployment. In some examples, an unmanned vehicle includes a drive system and a chassis. The chassis includes a platform for carrying an unmanned aerial vehicle and a retainer configured to secure the unmanned aerial vehicle to the platform while the drive system drives the unmanned vehicle. The clamping system includes at least a first rotating bar and a protrusion from the first rotating bar.

20 Claims, 7 Drawing Sheets

(51) Int. Cl.
  B60P 3/11 (2006.01)
  B60R 9/042 (2006.01)
  G05D 1/02 (2020.01)
  B60R 9/048 (2006.01)
  B64U 10/13 (2023.01)
  B64U 70/00 (2023.01)
  B64U 80/86 (2023.01)

(52) U.S. Cl.
  CPC ......... B64C 39/024 (2013.01); G05D 1/0276 (2013.01); *B64U 10/13* (2023.01); *B64U 70/00* (2023.01); *B64U 80/86* (2023.01)

(58) Field of Classification Search
  CPC .......... B64C 2201/027; B64C 2201/18; B64C 2201/208; B64C 2201/024; B64F 1/12
  See application file for complete search history.

(56) References Cited

U.S. PATENT DOCUMENTS

| | | | |
|---|---|---|---|
| 9,387,928 B1* | 7/2016 | Gentry | B60L 53/00 |
| 9,845,165 B2 | 12/2017 | Michalski et al. | |
| 10,124,912 B2 | 11/2018 | Walsh et al. | |
| 10,156,854 B2 | 12/2018 | Yang et al. | |
| 1,089,092 A1† | 1/2021 | Gillett | |
| 2006/0012096 A1* | 1/2006 | Geldert | B60R 9/045 |
| | | | 269/203 |
| 2015/0051758 A1 | 2/2015 | Cho | |
| 2016/0039541 A1* | 2/2016 | Beardsley | G05D 1/042 |
| | | | 701/2 |
| 2017/0129603 A1* | 5/2017 | Raptopoulos | B64C 39/024 |
| 2018/0029723 A1 | 2/2018 | Krauss et al. | |
| 2018/0164891 A1* | 6/2018 | Zhang | G01S 7/539 |
| 2019/0061944 A1* | 2/2019 | Zvara | B64D 1/22 |
| 2019/0369641 A1† | 12/2019 | Gillett | |
| 2022/0247347 A1* | 8/2022 | Gavrilov | B08B 3/024 |

FOREIGN PATENT DOCUMENTS

| | | |
|---|---|---|
| CN | 103700286 B | 7/2015 |
| CN | 105182995 A | 12/2015 |
| CN | 105197252 A | 12/2015 |
| CN | 105848533 A | 8/2016 |
| CN | 106444824 A | 2/2017 |
| JP | 2018506475 A | 3/2018 |
| KR | 101262968 B1 | 5/2013 |

OTHER PUBLICATIONS

Azur Drones, 2018 https://www.azurdrones.com/ [Downloaded: https://www.youtube.com/watch?v=TsEw0Ob9nrs].

Percepto Autonomous Drones,2017 https://percepto.co/ [Downloaded: https://www.youtube.com/watch?v=Q5qSq-KRu2k].

\* cited by examiner
† cited by third party

UNMANNED AERIAL VEHICLE LOCKING LANDING PAD

CROSS-REFERENCE TO RELATED APPLICATIONS

This U.S. Patent Application claims priority to and the benefit of U.S. Patent Application No. 62/887,294 filed Aug. 15, 2019, which is incorporated herein by reference in its entirety.

STATEMENT REGARDING FEDERALLY SPONSORED RESEARCH OR DEVELOPMENT

This invention was made with government support under Contract No. HR0011-18-C-0113 awarded by DARPA. The government has certain rights in the invention.

BACKGROUND

Robots are useful in a variety of civilian, military, and law enforcement applications. For instance, an autonomous vehicle can be used to inspect or search buildings under hazardous or hostile conditions. Dangerous situations can be improved by providing detailed information about the location, activities, and capabilities of opponents. Military applications can include reconnaissance, surveillance, bomb disposal and security patrols.

SUMMARY

This specification describes systems for unmanned aerial vehicle carrying and deployment. In some examples, an unmanned vehicle includes a drive system and a chassis. The chassis includes a platform for carrying an unmanned aerial vehicle and a retainer configured to secure the unmanned aerial vehicle to the platform while the drive system drives the unmanned vehicle. The clamping system includes at least a first rotating bar and a protrusion from the first rotating bar.

In some examples, a system includes an unmanned aerial vehicle and an unmanned vehicle. The unmanned vehicle includes a platform for carrying the unmanned aerial vehicle and a retainer configured to secure the unmanned aerial vehicle to the platform. The unmanned aerial vehicle is configured for landing on the platform and, after landing, transmitting a locking signal to the unmanned vehicle, causing the retainer to secure the unmanned aerial vehicle to the platform by rotating a first rotating bar such that a protrusion from the first rotating bar contacts the unmanned aerial vehicle.

In some examples, a locking landing pad includes a platform for supporting the unmanned aerial vehicle and a retainer configured to secure the unmanned aerial vehicle to the platform. The retainer includes a first rotating bar on a first side of the platform, the first rotating bar comprising a first protrusion; and a second rotating bar on a second side of the platform, the second rotating bar comprising a second protrusion. Securing the unmanned aerial vehicle to the platform includes rotating the first rotating bar in a first rotational direction such that the first protrusion from the first rotating bar contacts the unmanned aerial vehicle and rotating the second rotating bar in a second rotational direction such that the second protrusion from the second rotating bar contacts the unmanned aerial vehicle.

The control systems described in this specification may be implemented in hardware, software, firmware, or combinations of hardware, software and/or firmware. In some examples, the control systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

DESCRIPTION

In order to fully explore certain areas such as subterranean environments, an exploration system should be able to explore tall ceiling and vertical shafts. The sensors and cameras on some conventional ground-based robots may not capable of viewing and mapping these types of features.

In order to map these and locate artifacts, an unmanned aerial vehicle can be launched from the top of a ground vehicle. After exploring, the unmanned aerial vehicle can land on top of the ground vehicle, e.g., by visually locating an April tag as the landing zone, and then is held in place with a locking mechanism. In some examples, one or more long bars are run between the legs of the unmanned aerial vehicle. When it lands, one or more rotating bars mounted on the ground vehicle rotate to clamp the bars on the unmanned aerial vehicle. This holds the unmanned aerial vehicle in place while the ground robot travels through the tunnel, while also giving the unmanned aerial vehicle a large landing pad to accommodate any error in the landing procedure.

Figure 1:
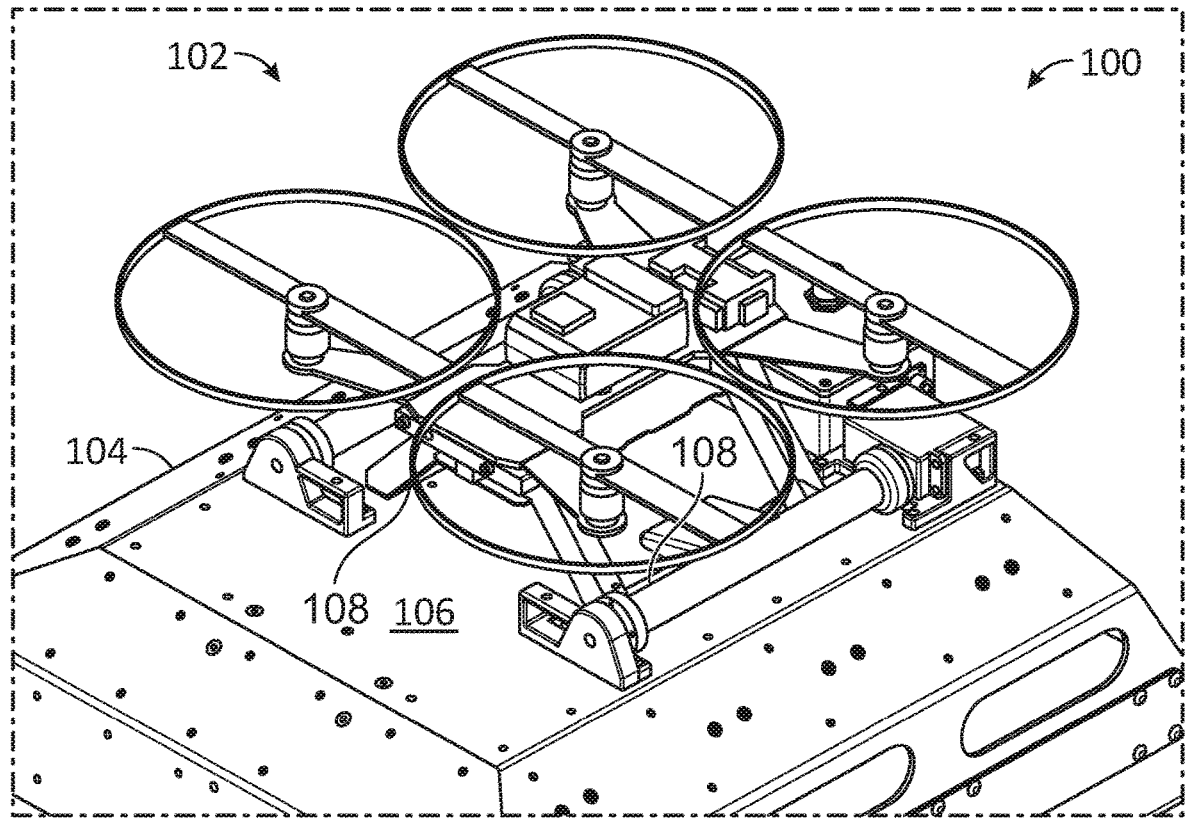
FIG. 1 illustrates an example robotic vehicle system.

FIG. 1 illustrates an example robotic vehicle system 100 that can be used as an unmanned vehicle capable of conducting operations in various environments such as urban terrain, tunnels, sewers, and caves. The system 100 can aid in the performance of urban Intelligence, Surveillance, and Reconnaissance (ISR) missions, chemical/Toxic Industrial Chemicals (TIC), Toxic Industrial Materials (TIM), and reconnaissance.

The system 100 includes an unmanned aerial vehicle 102 and an unmanned vehicle 104. The unmanned vehicle 104 includes a drive system and a chassis that includes a platform 106 for carrying the unmanned aerial vehicle 102. The unmanned vehicle 104 includes a retainer configured for securing the unmanned aerial vehicle 102 to the platform 106.

The unmanned aerial vehicle 102 is configured for landing on the platform 106 and, after landing, transmitting a locking signal to the unmanned vehicle 104, causing the retainer to secure the unmanned aerial vehicle 102 to the platform 106 by rotating a rotating bar such that a protrusion from the rotating bar contacts the unmanned aerial vehicle 102. The retainer is described further below with reference to FIG. 2.

The unmanned vehicle 104 can be, e.g., an unmanned ground vehicle. For example, the unmanned vehicle 104 can be an unmanned ground vehicle having the platform 106 on top of the unmanned ground vehicle, and the unmanned vehicle 104 can include a drive system of one or more motors and right and left driven track assemblies mounted on right and left sides of the unmanned ground vehicle.

The unmanned aerial vehicle 102 can be, e.g., a multi-rotor aerial vehicle configured for vertical take-off and landing on the platform. In general, the retainer can secure the unmanned aerial vehicle 102 by contacting any appropriate location on the unmanned aerial vehicle 102. In some examples, the unmanned aerial vehicle 102 includes a base for contacting the platform 106, and the base includes multiple legs and skid bars 108 connecting legs of the base. Then, the retainer can secure the unmanned aerial vehicle 102 to the platform 106 by rotating a rotating bar such that a protrusion contacts the skid bars 108.

Figure 2:
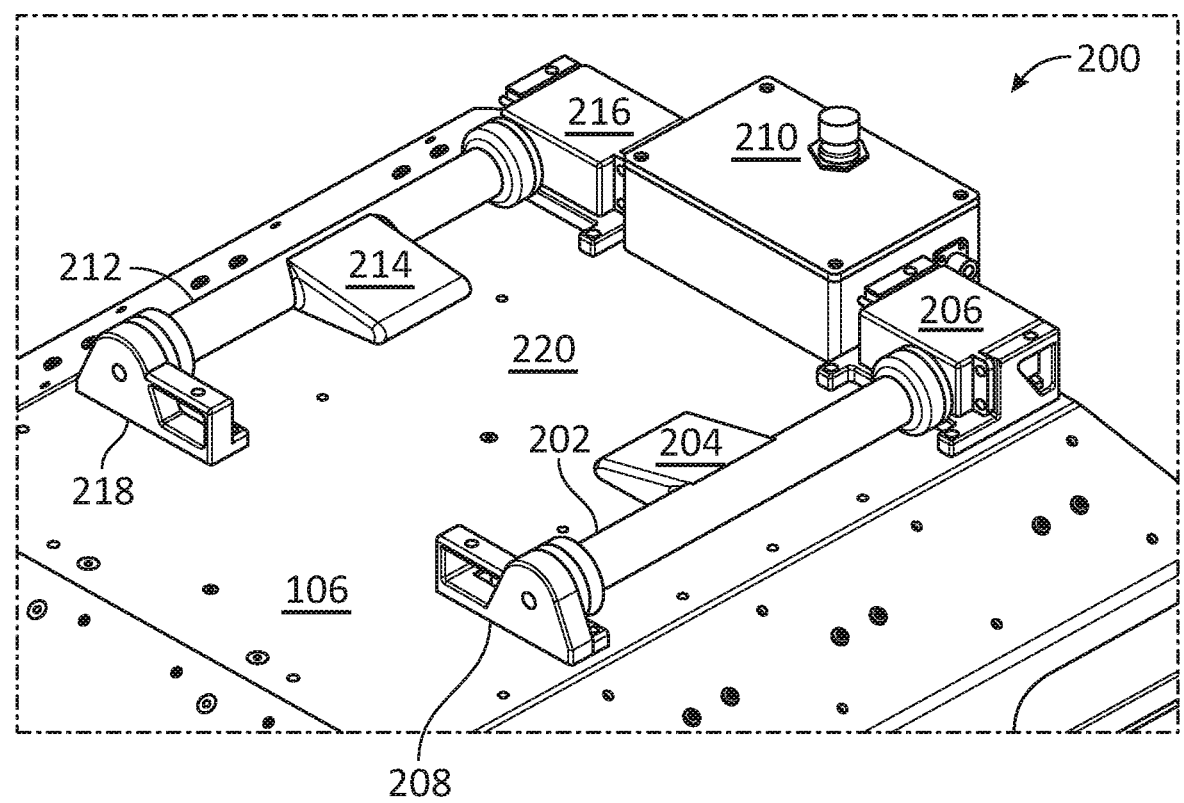
FIG. 2 shows an example retainer configured to secure an unmanned aerial vehicle to a platform.

FIG. 2 shows an example retainer 200 configured to secure the unmanned aerial vehicle 102 to the platform 106. The retainer 200 includes a first rotating bar 202 and a protrusion 204 from the first rotating bar 202. The first rotating bar 202 is driven on a first end of the first rotating bar 202 by a first servo motor 206. The first rotating bar 202 is secured to the platform 106 at a second end of the first rotating bar 202 by a pin running through a bracket 208. The retainer includes an electronics box 210, e.g., a housing enclosing circuits configured for controlling servomotors.

Securing the unmanned aerial vehicle 102 to the platform 106 includes controlling the first servo motor 206 to rotate the first rotating bar 202 such that the protrusion 204 from the first rotating bar 202 contacts the unmanned aerial vehicle 102. For example, securing the unmanned aerial vehicle 102 can include rotating the first rotating bar 202 such that the protrusion 204 presses downward on a skid bar 108 or other appropriate component of the unmanned aerial vehicle 102 with sufficient force to prevent the unmanned aerial vehicle 102 from sliding or falling off the platform 106 when the unmanned vehicle 104 is in motion.

In some examples, securing the unmanned aerial vehicle 102 to the platform 106 includes rotating the first rotating bar 202 in a first rotational direction such that the protrusion from the first rotating bar contacts the unmanned aerial vehicle. Then, the retainer is configured for releasing the unmanned aerial vehicle 102 by rotating the first rotating bar 202 in a second rotational direction such that the protrusion 204 rotates away from the unmanned aerial vehicle. For example, the first rotating bar 202 can rotate in a counter clockwise direction (when viewing the first rotating bar 202 from the bracket 208 towards the first servo motor 206) to secure the unmanned aerial vehicle 104, and then the first rotating bar 202 can rotate in a clockwise direction to release the unmanned aerial vehicle 102.

In some examples, the retainer 200 includes a second rotating bar 212 and a second protrusion 214 from the second rotating bar 212. The second rotating bar 212 is driven on a first end of the second rotating bar 212 by a second servo motor 216. The second rotating bar 212 is secured to the platform 106 at a second end of the second rotating bar 212 by a pin running through a bracket 218.

The first rotating bar 202 is located on a first side of the platform 106 and the second rotating bar 212 is located on a second side of the platform 106 opposite the first side. For example, the first rotating bar 202 can be on one side of a landing zone 220 and the second rotating bar 202 can be on the opposite side of the landing zone 220. In some examples, the first rotating bar 202 and the second rotating bar 212 both extend in a longitudinal direction and the first rotating bar 202 and the second rotating bar 212 are substantially in parallel to each other.

Securing the unmanned aerial vehicle to the platform can include rotating the first rotating bar 202 in a first rotational direction and rotating the second rotating bar 212 in a second rotational direction opposite the first rotational direction such that the protrusion 204 of the first rotating bar 202 contacts a first side of the unmanned aerial vehicle 102 and that the second protrusion 214 of the second rotating bar 212 contacts a second side of the unmanned aerial vehicle 102. For example, the first rotating bar 202 can rotate in a counter-clockwise direction such that the protrusion 204 contacts a first skid bar 108 of the unmanned aerial vehicle 102, and the second rotating bar 212 can rotate in a clockwise direction such that the second protrusion 214 contacts a second skid bar 108 of the unmanned aerial vehicle 102. The retainer 200 can release the unmanned aerial vehicle 102 by reversing the directions of rotation.

The protrusion 204 can have any appropriate shape. In some examples, the protrusion 204 can be a wedge tapering from a first end secured to the first rotating bar 202 to a second end distal from the first rotating bar 202. In some examples, the protrusion 204 can include a compliant pad (e.g., made of rubber or other appropriate material) for contacting the unmanned aerial vehicle 102, e.g., to press onto a skid bar 108 on the unmanned aerial vehicle 102.

The first rotating bar 202 and the protrusion 204 from the first rotating bar 202 can be formed from any appropriate materials. In some examples, the first rotating bar 202 and the protrusion 204 from the first rotating bar 202 are formed as a single solid piece of polymer, e.g., as a single printed piece.

In some examples, the landing zone 220 includes a visual feature enabling the unmanned aerial vehicle 102 to locate and land on the platform 106. For example, the landing zone 220 can have an April tag printed on the surface of the platform 106. April Tag is a visual fiducial system that includes targets and associated detection software for computing 3D position, orientation, and identity of tags relative to a camera.

Figure 3:
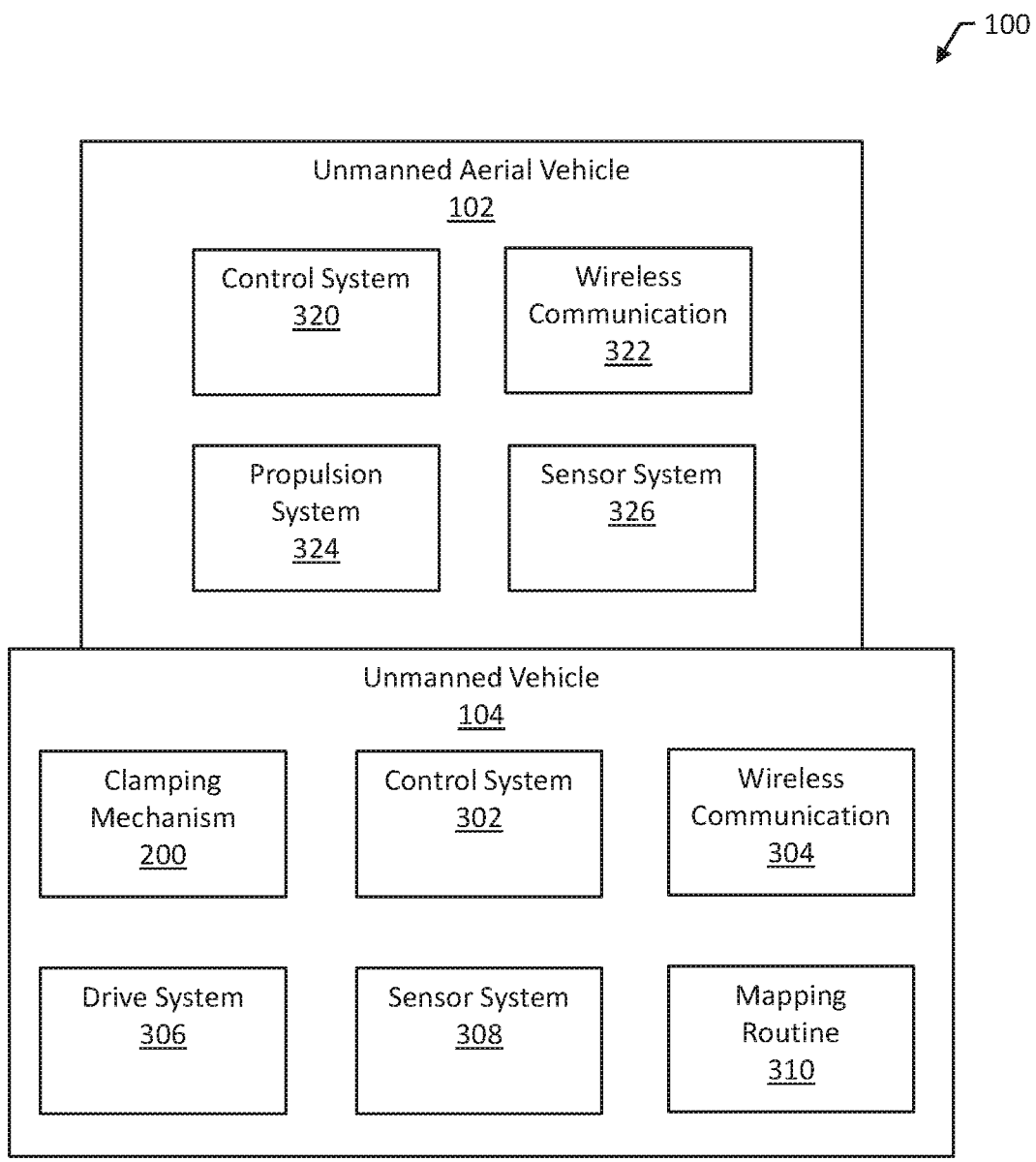
FIG. 3 is a block diagram of the example robotic vehicle system.

FIG. 3 is a block diagram of the example robotic vehicle system 100 of FIG. 1. The unmanned vehicle 104 includes the retainer 200 of FIG. 2.

The unmanned vehicle 104 also includes a control system 302, e.g., a processor and memory storing executable instructions for the processor. The control system 302 can be configured for driving a drive system 306 of the unmanned vehicle 104. The control system 302 can be configured for autonomous or semi-autonomous operation, and the control system 302 can be configured for receiving commands from a remote operator control unit.

The unmanned vehicle 104 includes a wireless communications system 304. The control system 302 is configured for receiving, using the wireless communications system 304, a locking signal transmitted by the unmanned aerial vehicle 102 when the unmanned aerial vehicle 102 lands on the platform 106 of the unmanned vehicle 104. In response to receiving the locking signal, the control system 302 controls the retainer to secure the unmanned aerial vehicle 102 to the platform 106.

In some examples, the unmanned vehicle 104 includes a sensor system 308. The sensor system 308 can include one or more appropriate sensors for mapping various environments such as urban terrain, tunnels, sewers, and caves. For example, the sensor system 308 can include one or more cameras and one or more range-finding sensors.

In some examples, the unmanned vehicle 104 includes a mapping routine 310. The control system 302 executes the mapping routine 310, which can include driving the drive system 306 and mapping an area using sensor signals received from the sensor system 308. The unmanned vehicle 104 can be configured to release the unmanned aerial vehicle 102 while executing the mapping routine 310.

For example, the control system 302 can be configured for determining that a surface within the area is beyond a range of the sensor system 308 and, in response, controlling the retainer 200 to release the unmanned aerial vehicle 102 and transmitting, using the wireless communication system 304, a deployment signal to the unmanned aerial vehicle 102. The unmanned aerial vehicle 102 can, in response, lift off the platform 106 can map the surface beyond the range of the sensor system 308. In some examples, the unmanned aerial vehicle 102 transmits mapping data to the unmanned vehicle to be included in a resulting map generated by execution of the mapping routine 310.

The unmanned aerial vehicle 102 includes, in some examples, a control system 320, a wireless communication system 322, a propulsion system 324, and a sensor system 326. The sensor system 326 can include, e.g., a camera. The control system 320 can be configured for locating a visual feature on the platform 106 using the sensor system 326 and landing the unmanned aerial vehicle 102 on the platform 106 using the propulsion system 324. The control system 320 can be configured for transmitting, using the wireless communication system 322, a locking signal to the unmanned vehicle 104 after landing.

Figure 4:
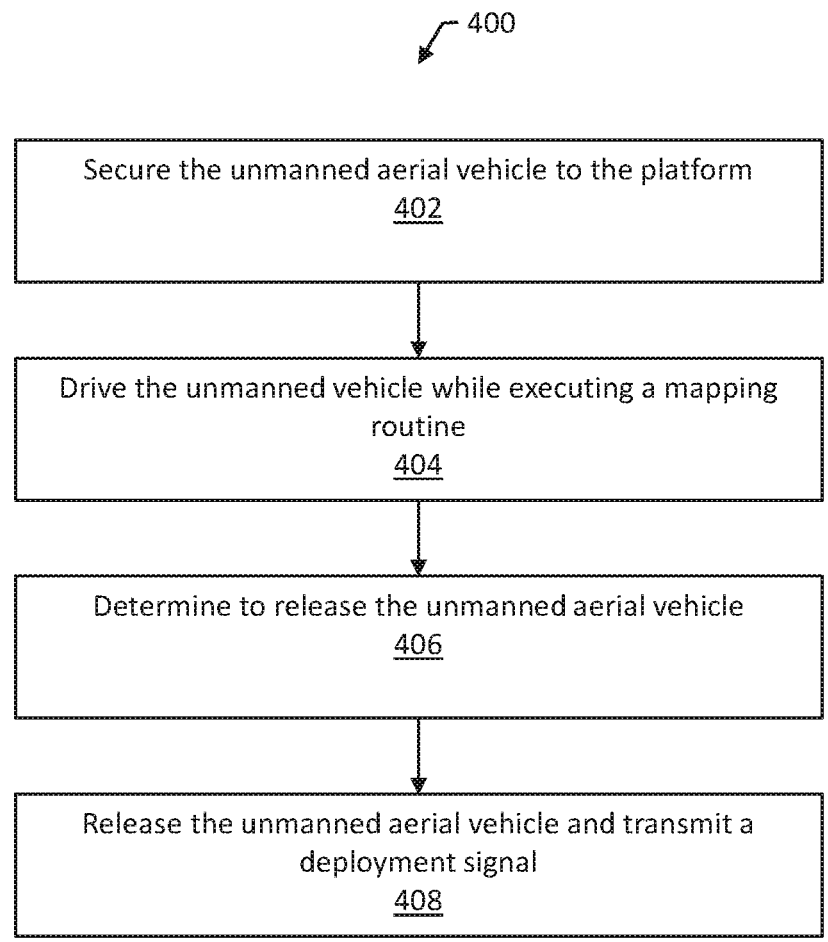
FIG. 4 is a flow diagram of an example method for mapping an area using a robotic system.

FIG. 4 is a flow diagram of an example method 400 for mapping an area using a robotic system, e.g., the robotic system 100 of FIG. 1. The method 400 includes securing an unmanned aerial vehicle to a platform on a chassis of an unmanned vehicle by rotating a first rotating bar and causing a protrusion of the first rotating bar to contact the unmanned aerial vehicle (402).

In some examples, securing the unmanned aerial vehicle to the platform comprises rotating a second rotating bar such that a second protrusion from the second rotating bar contacts the unmanned aerial vehicle. Securing the unmanned aerial vehicle to the platform can include rotating the first rotating bar in a first rotational direction and rotating the second rotating bar in a second rotational direction opposite the first rotational direction such that the protrusion of the first rotating bar contacts a first side of the unmanned aerial vehicle and that the second protrusion of the second rotating bar contacts a second side of the unmanned aerial vehicle.

The method 400 includes driving a drive system of the unmanned vehicle while securing the unmanned aerial vehicle to the platform and executing a mapping routine (404). The unmanned aerial vehicle is held tightly enough to prevent falling off due to the slopes, accelerations, and vibrations that the unmanned vehicle experiences during exploration. The method 400 includes determining to release the unmanned aerial vehicle (406). For example, the method 400 can include determining that a surface within the area is beyond a range of a sensor system, or the method 400 can include receiving a release command from a remote operator control unit.

The method includes releasing the unmanned aerial vehicle by rotating the first rotating bar and transmitting a deployment signal to the unmanned aerial vehicle, causing the unmanned aerial vehicle to map the surface beyond the range of the sensor system (408). The unmanned aerial vehicle may then autonomously land and transmit a locking signal to the unmanned vehicle to secure the unmanned aerial vehicle to the platform.

Figure 5A:
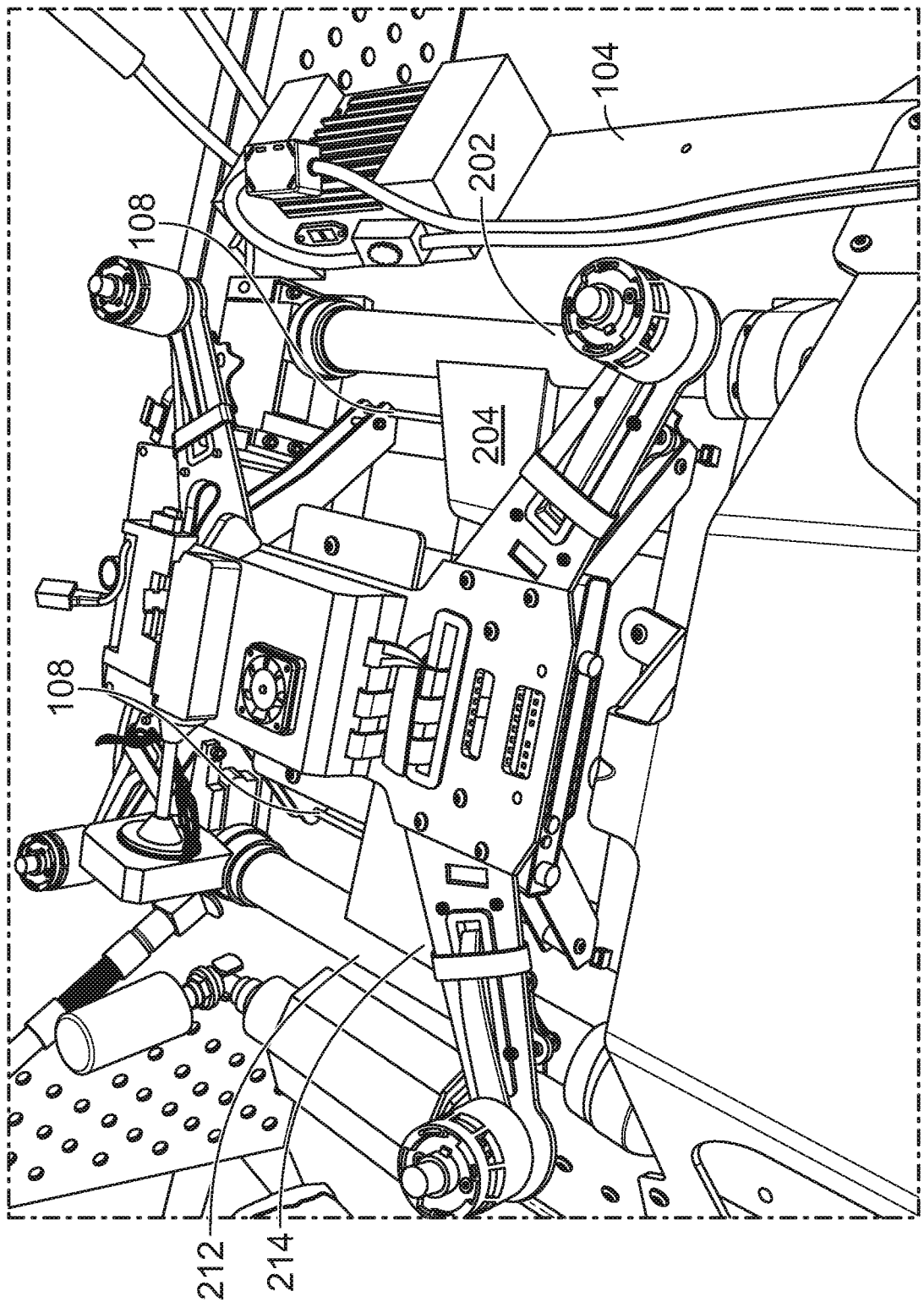
FIGS. 5A-5C show an example locking landing pad securing an example unmanned aerial vehicle.
Figure 5B:
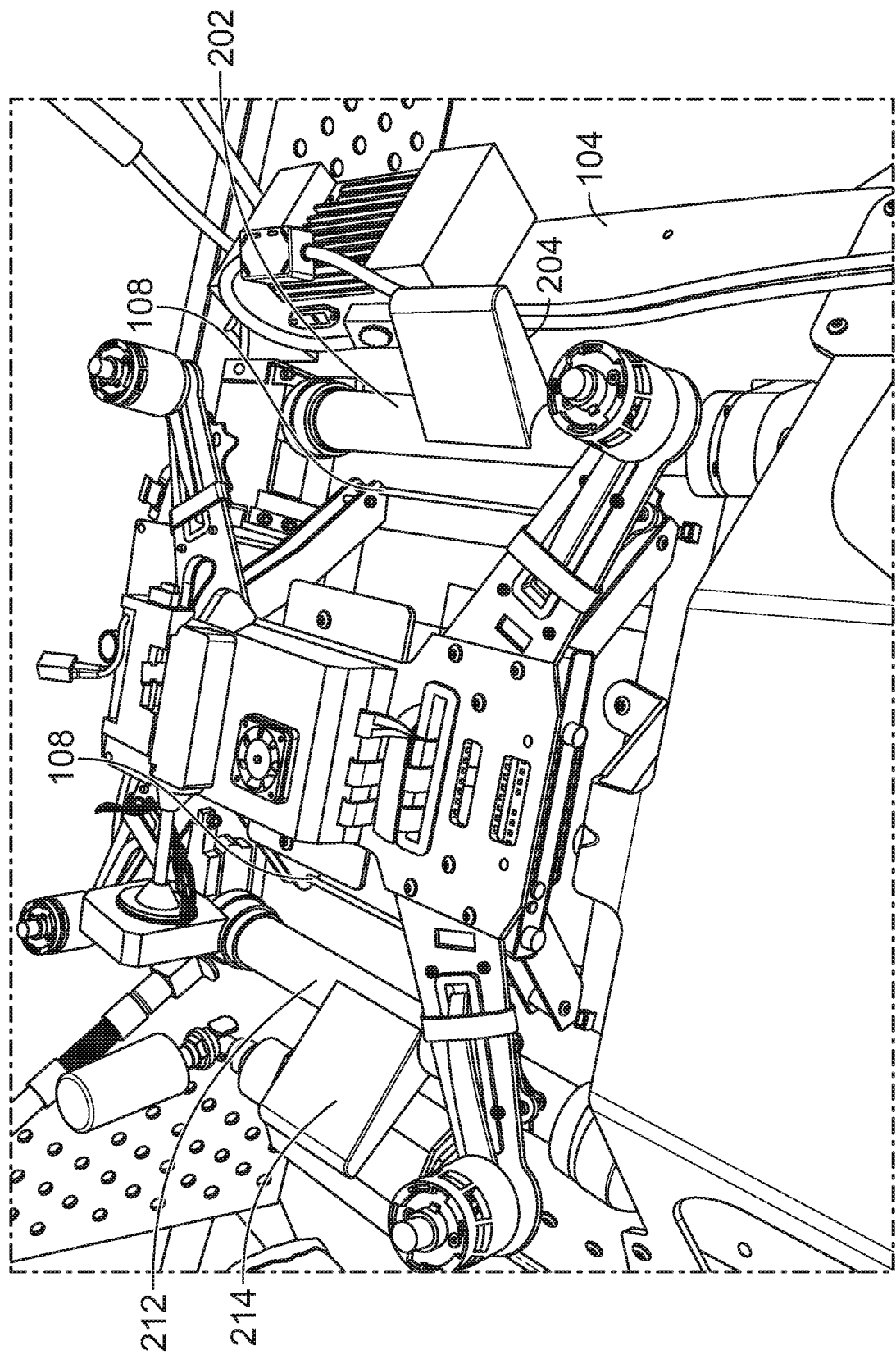
Figure 5C:
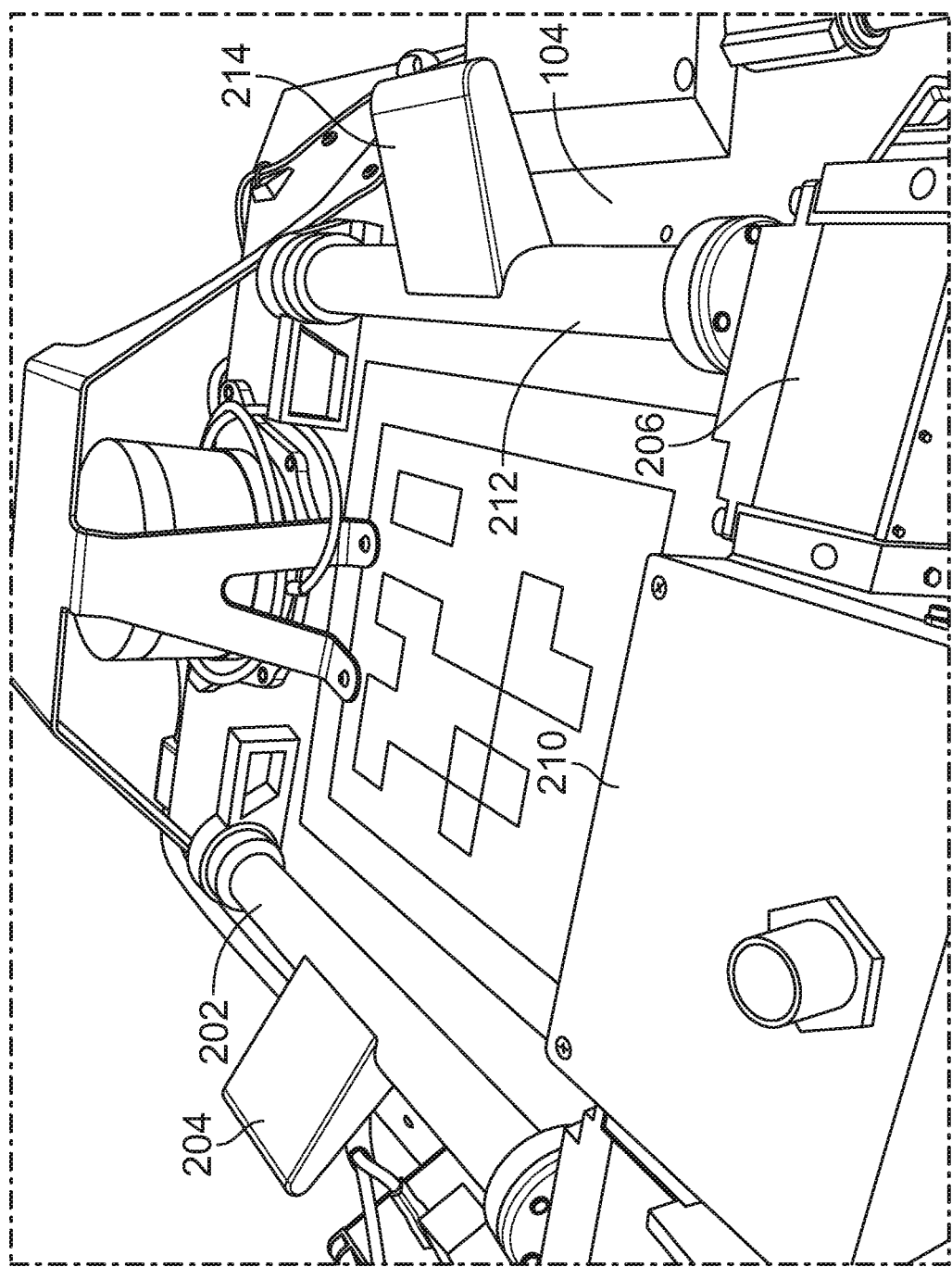

FIGS. 5A-5C show an example locking landing pad securing an example unmanned aerial vehicle. FIG. 5A shows the locking landing pad securing the unmanned aerial vehicle to the platform, and FIG. 5B shows the locking landing pad releasing the unmanned aerial vehicle. FIG. 5C shows the platform without an unmanned aerial vehicle to show an example April tag, which can be used for locating and landing on the platform.

The locking landing pad includes a platform for supporting the unmanned aerial vehicle and a retainer configured for securing the unmanned aerial vehicle to the platform. The retainer includes a first rotating bar on a first side of the platform, the first rotating bar having a first protrusion, and a second rotating bar on a second side of the platform, the second rotating bar having a second protrusion. Securing the unmanned aerial vehicle to the platform includes rotating the first rotating bar in a first rotational direction such that the first protrusion from the first rotating bar contacts the unmanned aerial vehicle and rotating the second rotating bar in a second rotational direction such that the second protrusion from the second rotating bar contacts the unmanned aerial vehicle.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed as new and desired to be protected is:

1. A method for securing an unmanned aerial vehicle to an unmanned vehicle, the method comprising:
   securing the unmanned aerial vehicle to a platform on a chassis of the unmanned vehicle as the unmanned aerial vehicle stands in a landing zone of the platform, the securing being performed by at least:
      a first servo motor rotating a first rotating bar at a first end of the first rotating bar and causing a protrusion of the first rotating bar to contact the unmanned aerial vehicle and press downward on a skid bar of the unmanned aerial vehicle with sufficient force to impede the unmanned aerial vehicle from sliding off the platform when the unmanned vehicle is in motion; and a second servo motor rotating a second rotating bar at a first end of the second rotating bar and causing a protrusion of the second rotating bar to contact a second skid bar of the unmanned aerial vehicle;

wherein the platform comprises a first side and a second side opposite the first side, and the landing zone comprises a first side on the first side of the platform and a second side on the second side of the platform;

wherein the first rotating bar is located on the first side of the platform and the second rotating bar is located on the second side of the platform;

wherein the first rotating bar and the second rotating bar both extend in a longitudinal direction along the entire first and second sides of the landing zone, and the first rotating bar and the second rotating bar are oriented substantially in parallel to each other; and the method further comprises driving a drive system of the unmanned vehicle while securing the unmanned aerial vehicle to the platform.

2. The method of claim 1, wherein securing the unmanned aerial vehicle to the platform comprises rotating the first rotating bar in a first rotational direction to cause the protrusion of the first rotating bar to press downward on the skid bar of the unmanned aerial vehicle with sufficient force to prevent the unmanned aerial vehicle from sliding off the platform when the unmanned vehicle is in motion, and wherein the method comprises releasing the unmanned aerial vehicle by at least rotating the first rotating bar in a second rotational direction such that the protrusion rotates away from the unmanned aerial vehicle.

3. The method of claim 1, wherein securing the unmanned aerial vehicle to the platform comprises rotating the first rotating bar in a first rotational direction and rotating the second rotating bar in a second rotational direction opposite the first rotational direction such that the protrusion of the first rotating bar contacts a first side of the unmanned aerial vehicle and that the second protrusion of the second rotating bar contacts a second side of the unmanned aerial vehicle.

4. The method of claim 1, wherein securing the unmanned aerial vehicle to the platform comprises receiving a locking signal transmitted by the unmanned aerial vehicle when the unmanned aerial vehicle lands on the platform, and, in response to receiving the locking signal, rotating the first rotating bar.

5. The method of claim 1, comprising:
executing a mapping routine for mapping an area using sensor signals received from a sensor system of the unmanned vehicle;
determining that a surface within the area is beyond a range of the sensor system; and
releasing the unmanned aerial vehicle by at least rotating the first rotating bar and transmitting a deployment signal to the unmanned aerial vehicle, causing the unmanned aerial vehicle to map the surface beyond the range of the sensor system.

6. The method of claim 1, wherein the unmanned vehicle is an unmanned ground vehicle and the platform is on top of the unmanned ground vehicle, wherein the drive system comprises one or more motors and right and left driven track assemblies mounted on right and left sides of the unmanned ground vehicle, wherein the unmanned aerial vehicle comprises a multi-rotor aerial vehicle configured for vertical take-off and landing on the platform, and wherein the platform comprises a visual feature enabling the unmanned aerial vehicle to locate and land on the platform.

7. An unmanned vehicle comprising:
a drive system; and
a chassis comprising:
a platform configured to carry an unmanned aerial vehicle, the platform comprising a landing zone, the platform comprising a first side and a second side opposite the first side, the landing zone comprising a first side on the first side of the platform and a second side on the second side of the platform; and
a retainer configured to secure the unmanned aerial vehicle to the platform while the drive system drives the unmanned vehicle, wherein the retainer comprises at least:
a first rotating bar and a protrusion from the first rotating bar; and
a second rotating bar and a second protrusion from the second rotating bar;
wherein the first rotating bar is located on the first side of the platform and the second rotating bar is located on the second side of the platform;
wherein the first rotating bar and the second rotating bar both extend in a longitudinal direction along the entire first and second sides of the landing zone, and the first rotating bar and the second rotating bar are oriented substantially in parallel to each other;
wherein the first rotating bar is driven on a first end of the first rotating bar by a first servo motor, and the second rotating bar is driven on a first end of the second rotating bar by a second servo motor; and
wherein the unmanned vehicle further comprises a control system configured to control the retainer to perform the method of claim 1.

8. The unmanned vehicle of claim 7, wherein the first rotating bar is secured to the platform at a second end of the first rotating bar by a pin running through a bracket.

9. The unmanned vehicle of claim 7, wherein securing the unmanned aerial vehicle to the platform comprises rotating the first rotating bar in a first rotational direction such that the protrusion from the first rotating bar contacts the unmanned aerial vehicle and presses downward on the skid bar of the unmanned aerial vehicle with sufficient force to prevent the unmanned aerial vehicle from sliding off the platform when the unmanned vehicle is in motion, and
wherein the retainer is configured to release the unmanned aerial vehicle by at least rotating the first rotating bar in a second rotational direction such that the protrusion rotates away from the unmanned aerial vehicle.

10. The unmanned vehicle of claim 7, wherein securing the unmanned aerial vehicle to the platform comprises rotating the first rotating bar in a first rotational direction and rotating the second rotating bar in a second rotational direction opposite the first rotational direction such that the protrusion of the first rotating bar contacts the skid bar at a first side of the unmanned aerial vehicle and that the second protrusion of the second rotating bar contacts the second skid bar at a second side of the unmanned aerial vehicle.

11. The unmanned vehicle of claim 7, wherein the protrusion extends part of a length of the first rotating bar and comprises a wedge tapering from a first end secured to the first rotating bar to a second end distal from the first rotating bar, and wherein the protrusion comprises a compliant pad configured to contact the skid bar on the unmanned aerial vehicle.

12. The unmanned vehicle of claim 7, wherein the control system is configured to receive a locking signal transmitted by the unmanned aerial vehicle when the unmanned aerial vehicle lands on the platform, and, in response to receiving the locking signal, control the retainer to secure the unmanned aerial vehicle to the platform by at least rotating the first rotating bar.

13. An unmanned vehicle comprising:
a drive system; and
a chassis comprising:
   a platform configured to carry an unmanned aerial vehicle; and
   a retainer configured to secure the unmanned aerial vehicle to the platform while the drive system drives the unmanned vehicle, wherein the retainer comprises at least a first rotating bar and a protrusion from the first rotating bar;
wherein the unmanned vehicle further comprises:
a sensor system; and
a control system configured for:
   receiving a locking signal transmitted by the unmanned aerial vehicle when the unmanned aerial vehicle lands on the platform, and, in response to receiving the locking signal, controlling the retainer to secure the unmanned aerial vehicle to the platform by at least rotating the first rotating bar;
   driving the drive system and executing a mapping routine for mapping an area using sensor signals received from the sensor system;
   determining that a surface within the area is to be mapped by the unmanned aerial vehicle; and
   controlling the retainer to release the unmanned aerial vehicle by at least rotating the first rotating bar and transmitting a deployment signal to the unmanned aerial vehicle, causing the unmanned aerial vehicle to map the surface to be mapped by the unmanned aerial vehicle.

14. The unmanned vehicle of claim 13, wherein:
determining that the surface within the area is to be mapped by the unmanned aerial vehicle comprises determining that the surface within the area is beyond a range of the sensor system;
the unmanned vehicle is an unmanned ground vehicle and the platform is on top of the unmanned ground vehicle, wherein the drive system comprises one or more motors and right and left driven track assemblies mounted on right and left sides of the unmanned ground vehicle, wherein the unmanned aerial vehicle comprises a multi-rotor aerial vehicle configured for vertical take-off and landing on the platform, and wherein the platform comprises a visual feature enabling the unmanned aerial vehicle to locate and land on the platform.

15. A system comprising the unmanned vehicle of claim 7, wherein the system further comprises:
the unmanned aerial vehicle; and
wherein the unmanned aerial vehicle is configured to land on the platform and, after landing, transmit a locking signal to the unmanned vehicle, to cause the retainer to secure the unmanned aerial vehicle to the platform by at least rotating the first rotating bar such that the protrusion from the first rotating bar contacts the unmanned aerial vehicle.

16. The system of claim 15, wherein the platform comprises a visual feature between the first rotating bar and a second rotating bar, and wherein the unmanned aerial vehicle further comprises a camera and wherein the control system is configured to land the unmanned aerial vehicle based at least partly on one or more images from the camera of the visual feature.

17. The unmanned aerial vehicle of claim 13, wherein determining that the surface within the area is to be mapped by the unmanned aerial vehicle comprises determining that the surface within the area is beyond a range of the sensor system.

18. The method of claim 1, wherein the securing is performed under control of a control system of the unmanned vehicle.

19. The method of claim 2, wherein the releasing is performed under control of a control system of the unmanned vehicle.

20. The unmanned vehicle of claim 9, wherein the control system is configured to control the retainer in releasing the unmanned aerial vehicle.

* * * * *